June 30, 1936.  H. W. WATERHOUSE  2,046,280

LOOM TEMPLE

Filed Feb. 21, 1936

INVENTOR.
HAROLD W. WATERHOUSE.
BY Claude F. Snider
ATTORNEY.

Patented June 30, 1936

2,046,280

UNITED STATES PATENT OFFICE 2,046,280

LOOM TEMPLE

Harold W. Waterhouse, Hopedale, Mass., assignor to Draper Corporation, Hopedale, Mass., a corporation of Maine Application February 21, 1936, Serial No. 65,100

3 Claims. (Cl. 139—298)

The present invention pertains to loom temples, and more particularly relates to the guiding and supporting means therefor.

Temples of the type mentioned usually include a fixed housing having a guideway wherein a reciprocating bar is mounted, the bar carrying the temple head which engages and stretches the cloth. The construction is such that the tension of the cloth pulls the bar inwardly of the loom against the inner wall of the guideway. The resulting pressure tends to cause undue wearing of the temple bar and the inner wall of the guideway. Such wearing of the temple parts has been of sufficient consequence that many devices have been made for patching up or repairing worn temples by supporting the bar in proper position in a worn guideway. Prior devices of the type mentioned do not prevent the temples from becoming worn, but only serve to restore worn temples to service.

I propose to provide, in a temple of the type mentioned, bar supporting means carried by the fixed housing, which means shall prevent the aforementioned undue wearing of the temple bar and guideway. To this end, I provide a temple housing wherein the inner wall of the guideway is recessed to receive a block of oil-impregnated bearing material which is in contact with the reciprocating temple bar, the block materially reducing the wearing of the bar and guideway by keeping the parts properly lubricated and also by relieving the wall of the guideway of at least part of the pressure caused by the pull of the cloth. Preferably, the housing is provided with an adjusting screw which acts on the bearing block in a direction to hold the latter in contact with the bar.

The preferred embodiment of the invention is illustrated on the accompanying drawing, of which:

Figure 1:
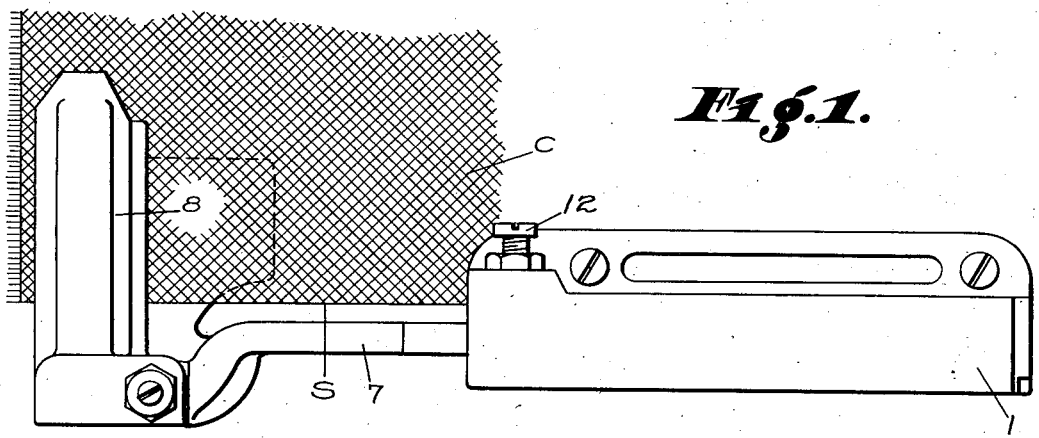
Fig. 1 is a plan view showing the temple in proper relation to the cloth being woven.
Figure 2:
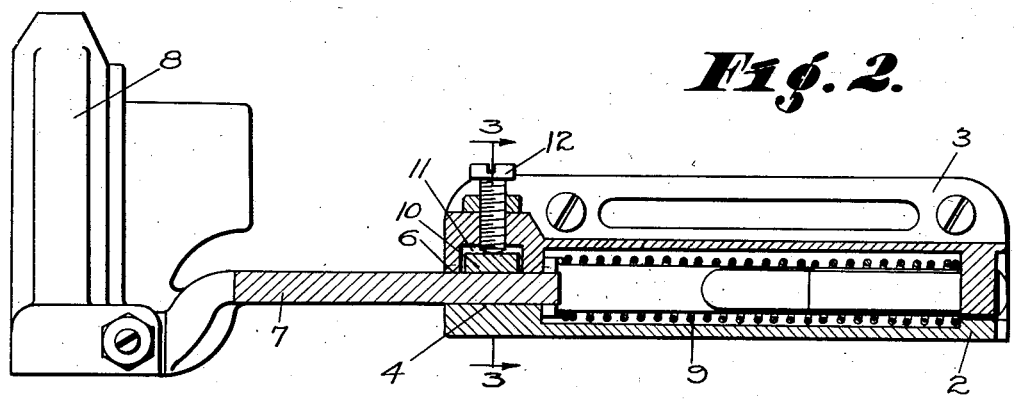
Fig. 2 is a view of the temple of Fig. 1 with the temple housing and bar broken away and appearing in section.
Figure 3:
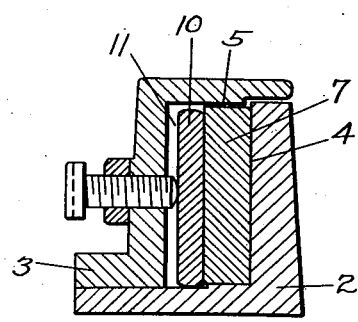
Fig. 3 is a view in cross-section taken approximately on line 3—3 of Fig. 2.

The temple shown on the drawing includes a housing 1 which may be comprised of an outer part 2 and an inner part 3 and which is adapted to be fixed to a loom (not shown) in such manner that it extends generally parallel to the selvage S of the cloth C being woven on the loom. The housing has a guideway 4 extending longitudinally therethrough. The guideway is defined by top and inner walls 5 and 6 respectively, formed on the inner part 3, and bottom and outer walls formed on the outer part 2.

A temple bar 7 is slidably mounted in the guideway 4 for reciprocation forwardly and rearwardly of the loom, which is in a direction parallel to the cloth selvage. The temple bar carries at its rearward end a laterally extending head 8 which is provided with any suitable usual means such as a roller (not shown) for laterally stretching the cloth as the latter is woven. The temple head and bar are moved forwardly each time a pick of filling is beaten into the cloth, and are returned rearwardly by a spring 9 which is housed within a recess formed in the walls of the guideway 4. It will be noted that, as is usual in temples of this type, the pull of the cloth tends to pull the temple bar inwardly of the loom against the inner vertical wall 6 of the guideway 4. More specifically, the tendency is to pull the bar hard against the rearward end of the wall.

The aforementioned pull of the bar against the inner wall of the guideway has been the direct cause of rapid wearing of the bar and guideway. Ordinary methods of lubrication are not a satisfactory solution to the problem because of the danger of spattering oil or grease onto the cloth. The present invention provides a construction wherein excessive wearing of the temple bar and guideway is eliminated without the application of dangerous quantities of lubricant to the temple bar.

The particular embodiment shown on the drawing includes a block 10 of oil-impregnated bearing material positioned in a recess 11 formed in the inner vertical wall 6 of the guideway. The recess is comprised of a groove, herein shown as rectangular in cross-section, formed in the wall 6 and opening toward or communicating with the guideway. The block 10 is formed of a suitable oil-impregnated material of the class of materials employed in so-called "oilless" bearings, the particular block shown being comprised of oil-impregnated bronze commercially known as Oilite. The block is loosely positioned in the recess whereby it may be removed for replacement purposes.

The block 10 is normally positioned in contact with the temple bar 7, whereby the block keeps the bar lubricated and thus materially reduces the wearing of the bar and guideway, this result being accomplished without providing any quantity of lubricant which could spatter onto the cloth. I have also provided an adjusting screw 12 which may used to merely hold the block in contact with the temple bar, or which may be used to push the block against the bar with sufficient force to relieve the wall 6 of part or all of the pressure of the bar. To this end, the screw 12 extends horizontally through the inner wall of the housing, being threaded therein, and bears against the block 10.

The construction of the present invention is particularly advantageous, not only in the respects above mentioned, but also in that the positioning of the bearing block within the confines of the housing 1 permits full reciprocation of the temple whereas prior devices positioned or extending rearwardly beyond the housing reduce the extent to which the temple can be reciprocated.

Having fully disclosed the preferred embodiment of my invention, I claim:

1. A loom temple comprising a housing having a guideway extending longitudinally therethrough, a longitudinally reciprocating temple bar slidably mounted in said guideway, a temple head at the rearward end of said bar, said temple being adapted to be positioned on a loom in such position that the cloth being woven pulls said bar laterally against one wall of said guideway, there being a recess in said wall, and a block of oil-impregnated bearing material removably positioned in said recess in contact with said bar.

2. A loom temple comprising a housing having a guideway extending longitudinally therethrough, a longitudinally reciprocating temple bar slidably mounted in said guideway, a temple head at the rearward end of said bar, said temple being adapted to be positioned on a loom in such position that the cloth being woven pulls said bar laterally against the inner wall of said guideway, there being a recess in said wall, a block of oil-impregnated bearing metal positioned in said recess in contact with said bar, and an adjusting screw in said housing, said screw acting on said block in a direction to hold the latter in contact with said bar.

3. A loom temple comprising a housing having a guideway extending longitudinally therethrough, a longitudinally reciprocating temple bar slidably mounted in said guideway, a temple head at the rearward end of said bar, said temple being adapted to be positioned on a loom in such position that the cloth being woven pulls said bar laterally against the rearward end of the inner vertical side wall of said guideway, said wall adjacent its rearward end having a recess which communicates with said guideway, a block of oil-impregnated bronze loosely positioned in said recess in contact with said bar, and an adjusting screw carried by said housing, said screw acting on said block in a direction to force the latter against said bar to thereby prevent wearing of said wall by the bar.

HAROLD W. WATERHOUSE.